United States Patent [19]

Shinoda et al.

[11] Patent Number: 4,810,836

[45] Date of Patent: Mar. 7, 1989

[54] OPTICAL FIBER-CONTAINING INSULATORS

[75] Inventors: Katsuro Shinoda, Nagoya; Toshiyuki Kawaguchi; Kazumi Nakanishi, both of Inuyama City; Noriyasu Oguri, Hashima; Hiroshi Harada, Handa; Isao Nakajima, Nagoya, all of Japan

[73] Assignee: NGK Insulators, LTD., Nagoya, Japan

[21] Appl. No.: 199,717

[22] Filed: May 27, 1988

[30] Foreign Application Priority Data

| Jun. 3, 1987 | [JP] | Japan | 62-86302[U] |
| Jun. 3, 1987 | [JP] | Japan | 62-86303[U] |
| Aug. 18, 1987 | [JP] | Japan | 62-125540[U] |
| Aug. 18, 1987 | [JP] | Japan | 62-125541[U] |
| Dec. 8, 1987 | [JP] | Japan | 62-186766[U] |
| Dec. 8, 1987 | [JP] | Japan | 62-186767[U] |
| Feb. 18, 1988 | [JP] | Japan | 68-36143 |

[51] Int. Cl.[4] .................. H01B 17/00; H01B 17/16; G02B 6/00
[52] U.S. Cl. .................................. 174/139; 174/150
[58] Field of Search ............. 174/139, 141 R, 150, 174/178, 179

[56] References Cited

FOREIGN PATENT DOCUMENTS

| 0146845 | 7/1985 | European Pat. Off. | 174/139 |
| 71395 | 6/1959 | France | 174/179 |
| 1357749 | 3/1964 | France | 174/179 |
| 60-158402 | 8/1985 | Japan | 174/139 |
| 60-262104 | 12/1985 | Japan | 174/139 |

Primary Examiner—Laramie E. Askin
Attorney, Agent, or Firm—Parkhurst, Oliff & Berridge

[57] ABSTRACT

Optical fiber-containing insulators each comprises an insulator body having a through hole provided in its central portion and extending along an axial direction thereof, an optical fiber core wire passing through the through hole, an insulating material filled between an inner peripheral surface of the through hole and the optical fiber core wire, and arrangements for preventing the filled insulating material from axially protruding out of the insulator body even at high temperature or spacers for holding the optical fiber core wire at the central portion of the through hole of the insulator body.

20 Claims, 13 Drawing Sheets

OPTICAL FIBER-CONTAINING INSULATORS

BACKGROUND OF THE INVENTION (1) Field of the Invention

The present invention relates to optical fiber-containing insulators in which an optical fiber is buried to transmit signals from a power transmission line to a ground contact side.

(2) Related Art Statement

As disclosed in Japanese patent application Laid-open No. 60-158,402, there have formerly been known optical fiber-containing insulators in which a through hole of a small diameter is formed in an axial portion of an insulator body and an optical fiber is passed through the through hole, while an insulating material such as an epoxy resin is filled between the inner peripheral surface of the through hole and the optical fiber. The insulating material filled has important roles in preventing a leakage current from flowing along the optical fiber and preventing decrease in a surface leakage-insulating distance of the insulator. When the insulator is subjected to high temperatures, the insulating material such as epoxy resin is greatly forced out from the insulator body in an axial direction thereof due to great difference in coefficient of thermal expansion between the porcelain and the insulating material so that a tension acts upon the optical fiber and that adhesion between the insulating material and the insulator body is lost. Consequently, it is feared that penetrating voltage resistance of the insulator is greatly lowered.

Further, since the through hole is long and small in diameter, it is difficult to accurately hold the optical fiber in the center of the through hole so that there is the possibility that the optical fiber partially touches the inner peripheral wall of the through hole. Since no insulating material is present between the optical fiber and the inner peripheral wall of the through hole there, adhesion is lost at that portion so that water or moisture is likely to enter to lower electric insulation performance.

SUMMARY OF THE INVENTION

The present invention has been accomplished to solve the above-mentioned problems.

The present inventors have first tried to prevent the axial protrusion of the insulating material from the insulator body and at the same time maintain or increase adhesion between the insulating material and the insulator body. However, since the pressure inside the insulator body became too high at high temperatures, there was a danger that the insulator be press cracked due to thermal expansion of the insulating material.

A first aspect of the present invention has been accomplished to obtain optical fiber-containing insulators which do not allow the insulating material from axially protruding out of the insulator body even at high temperatures, neither vary transmission loss of an optical fiber nor lower penetrating voltage resistance, and will not break due to thermal expansion.

A second aspect of the present invention has been accomplished to obtain optical fiber-containing insulators which can completely prevent reduction in insulation due to contact between the optical fiber and the inner peripheral wall of the through hole.

According to the first aspect of the present invention, there is a provision of an optical fiber-containing insulator comprising an insulator body having a through hole provided in its axially central portion, an optical fiber core wire passing through the through hole, an insulating material filled between an inner peripheral surface of the through hole and the optical fiber core wire, and means for preventing the filled insulating material from axially protruding out of the insulator body even at high temperatures without breaking the insulator body.

The protrusion-preventing means may be constituted by (1) taper portions which are provided at the inner peripheral surface of the through hole and enlarged axially outwardly from the middle portion to axially opposite ends of the through hole, respectively, (2) the insulating material itself consisting essentially of a non-foamable resin filled at the axially opposite ends of the through hole and a foamed resin having excellent expansibility and shrinkability or a combination of the non-foamable resin and the foamed resin filled in the through hole excluding the axially opposite ends thereof, (3) taper portions formed at the axially opposite ends of the through hole while enlarged axially outwardly at a tapering angle of 5° to 30° relative to the axis of the insulator body, or (4) the insulating material itself which consists essentially of gas-tight insulating sealed portions at the axially opposite ends of the through hole of the insulator body and a buffer portion provided at the central portion of the through hole for absorbing thermal expansion.

According to the second aspect of the present invention, there is a provision of an optical fiber-containing insulator comprising an insulator body having a through hole provided in its axially central portion, an optical fiber core wire passing through the through hole, an insulating material filled between an inner peripheral surface of the through hole and the optical fiber core wire, and means for holding the optical fiber core wire at substantially the central portion of the through hole of the insulator body.

The holding means may be constituted by (1) a spacer which is made of substantially the same material as that of the insulating material and has a central through hole through which the optical fiber is passed and which is inserted into the through hole, (2) porcelain spacers which each have a tapered outer peripheral surface expanded axially outwardly and a central through hole for the optical fiber and which are bonded to taper portions axially enlarged at the opposite ends of the through hole of the insulator body with an inorganic material, or (3) a toroidal hollow spacer which is made of substantially the same elastic material as that of the insulating material and which is inserted into the inner peripheral wall of the through hole of the insulator body while the optical fiber core is inserted and sealingly bonded with an inorganic material into the central hole of the spacer.

These and other objects, features, and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein.

DETAILED DESCRIPTION OF THE INVENTION

Figure 1:
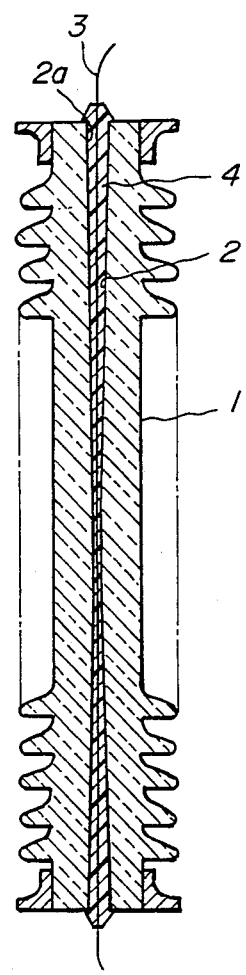
FIG. 1 is a central cross sectional view of an embodiment of the optical fiber-containing insulator according to the first aspect of the present invention.

Now, the present invention will be explained in more detail with reference to the attached drawings. In the drawings, the same or similar constituent elements are denoted by the same or similar reference numerals.

First turning to FIG. 1, reference numerals 1 and 2 denote an insulator body made of a porcelain and a through hole formed in the central portion of the insulator body 1. Taper portions 2a are provided in the inner peripheral wall of the through hole 2. Each of the taper portions 2a is enlarged radially outwardly in an axial direction from the middle portion to corresponding ones of axially opposite ends of the trough hole. A tapering degree of the taper portion is preferably in a range from 0.01 to 0.05. Assuming that a difference $\Delta D$ in diameter of the inner peripheral surface of the tapered portion between two levels which are spaced from each other by a distance l, the term "tapering degree" employed herein means the value of $\Delta D/l$. A reference numeral 3 denotes an optical fiber core wire which is passed through the tapered through hole 2. The optical fiber core wire 3 is fixed to the insulating body with an insulating material 4 such as an epoxy resin filled in the tapered through hole 2.

It is preferable to make the tapering degree at every location of the taper portion 2a of the through hole 2 constant. Meanwhile, it may be that a straight portion of about 100 mm long is provided at the middle portion of the through hole 2 of the insulator body 1 and the taper portions are formed on axially opposite sides of the straight portion. In order to enhance adhesion between the insulating material 4 such as silicone resin and the insulator body 1, it is preferable to apply no glaze to the inner surface of the tapered through hole 2.

Figure 2:
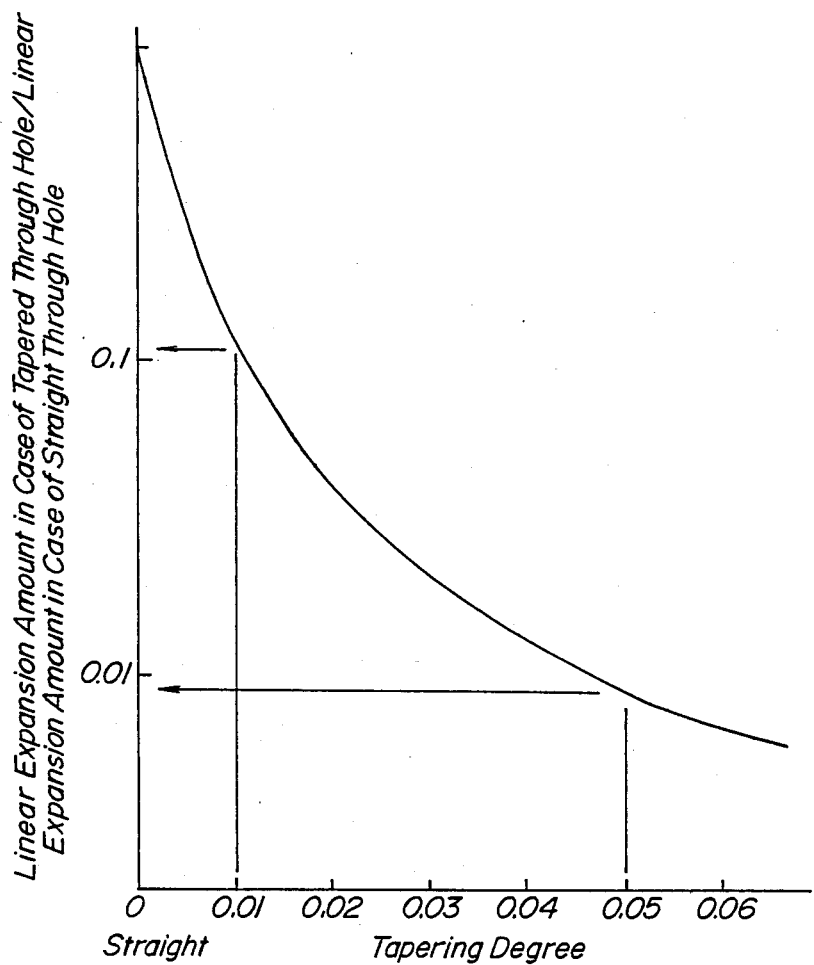
FIG. 2 is a diagram showing the relationship between the tapering degree of the taper portion of the through hole in the insulator body and the protrusion-reducing percentage of the insulating material.

As is the same with conventional optical fiber-containing insulators of this type, while the insulating body 1 supports a power transmission line or a high voltage line, the optical fiber-containing insulator thus constructed is used to transmit signals detected by a voltage sensor, an electric current sensor, a temperature sensor, or the like attached to an electrically charging portion after being converted into optical signals to a ground contact side through the optical fiber core wire 3 passed through the insulator body 1. In the present invention, since the through hole through which the optical fiber core wire 3 is passed is provided with the taper portions 2a, even when the insulator body is heated at high temperatures and the insulating material 4 such as the silicone resin filled inside the insulator body more greatly thermally expands than the insulator body 1, axial movement of the insulating material 4 is absorbed by the radially outwardly increasing sectional area of the taper portions which extend to the opposite ends of the through hole, respectively. Consequently, a projecting amount of the insulating material from the opposite ends of the insulator body 1 is greatly reduced as compared with conventional insulators having straight through holes. The decreased ratio in this case is shown in a diagram of FIG. 2. When the tapering degree of the tapered through hole 2 are 0.01 and 0.05, the projecting amounts of the insulating material are about 1/10 and about 1/100 of that in the corresponding conventional case, respectively. In this diagram, the linear expansion means an axially outward movement amount of the insulating material at the end surface of the insulator body. Therefore, tension acting upon the optical fiber core wire 3 due to the thermal expansion can greatly be reduced in the present invention, so that cutting of the optical fiber core wire and variation in the transmitting loss can be prevented and that adhesion between the insulator body 1 and the insulating material 4 is not lost. Thus, the penetrating voltage resistance of the entire insulator will not be damaged. In addition, since the optical fiber core wire 3 is assuredly protected with the insulating material 4, the former can be prevented from being exposed to salt, dusts, water, corrosive open atmosphere, etc., and there is no fear about deterioration thereof. Further, since the insulating material 4 at the central portion of the insulator body 1 is allowed to axially move following thermal expansion, it is not feared that the insulator is broken due to abnormal elevation of the internal pressure.

As is evident from the aforegoing explanation, according to the present invention, by forming the taper portions on the inner peripheral surface of the through hole bored in the insulator body for passing the optical fiber core wire therethrough, axial movement of the insulating material is greatly decreased, cutting of the optical fiber core wire, variation in the transmitting loss, and reduction of the penetrating voltage resistance of the insulator due to thermal stress can assuredly be prevented and possibility of the breakage of the insulator is diminished. Therefore, the present invention has an extremely great practical value as optical fiber-containing insulators completely diminishing the problems possessed by the prior art.

Next, other embodiments according to the first aspect of the present invention will be explained with reference to FIGS. 3 and 4. In these embodiments, axial protrusion of the insulating material from the insulator body is prevented by constituting the insulating material from two kinds of insulating materials, that is, a non-foamable insulating material filled in opposite end portions of the through hole and a foamed insulating material filled at the central portion of the through hole excluding the opposite end portions.

Figure 3:
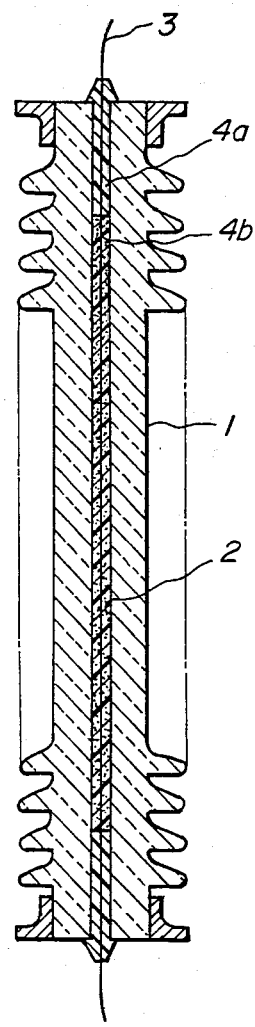
FIG. 3 is a central cross sectional view of another embodiment according to the first aspect of the present invention.

Now, turning to FIG. 3, reference numerals 1, 2 and 3 denote the same constituent elements as in FIG. 1, that is, an insulator body made of a porcelain, a through hole bored in the central portion of the insulator body, and an optical fiber core wire passed through the through hole, respectively. A non-foamable resin 4a such as a silicone resin or an epoxy resin is charged into opposite end portions of the through hole 2. The non-foamable resin 4a at the opposite end portions of the through hole serves to maintain gas tightness inside the through hole 2 to prevent invasion of open air, water, etc. thereinto. Since an electric field concentrates upon the opposite ends of the insulator, it is preferable to use a highly insulating resin such as silicone resin or epoxy resin. On the other hand, a foamed resin 4b is filled inside the through hole excluding the opposite end portions thereof. As the foamed resin 4b, use may be made of foamable styrol resin, foamable polyethylene resin, foamable silicon resin, etc. Since such a foamed resin has excellent expansibility and shrinkability and can readily expand or shrink depending upon applied pressure, even when the non-foamable resin 4a thermally expands at high temperatures, the foamed resin absorbs the thermal expansion to prevent axially outward projection of the non-foamable resin and cutting of the optical fiber core wire due to the projection. In order to improve adhesion between the insulator body and the resin, it is preferable to apply no glaze to the inner peripheral surface of the through hole.

Figure 4:
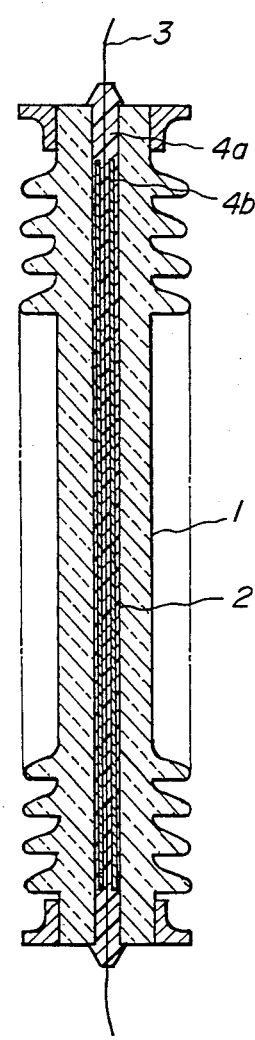
FIG. 4 is a central cross sectional view of still another embodiment according to the first aspect of the present invention.

FIG. 4 shows another embodiment of this type. Although it is a common feature between the above embodiment and FIG. 4 that the non-foamable resin 4a is filled in the opposite end portions of the through hole 2, a combination of the non-foamable resin 4a and the foamed resin 4b is employed inside the through hole 2 excluding the opposite end portions. That is, in order to avoid poor adhesion between the foamed resin 4b and the insulator body 1 or the optical fiber core wire, the non-foamable resin 4a is used only at a contact portion with the inner peripheral surface of the through hole and a contact portion with the optical fiber core wire, and the foamed resin 4b is filled in the remaining portion of the through hole.

As is the same with the embodiment described in connection with FIG. 1, while the insulator body 1 supports a power transmission line or a high voltage line, the thus constructed optical fiber-containing insulators are used to transmit signals detected by a voltage sensor, an electric current sensor, a temperature sensor, or the like attached to an electrically charging portion after being converted into optical signals to a ground contact side through the optical fiber core wire 3 passed through the insulator body 1. However, since the non-foamable resin 4a is filled into the opposite end portions of the through hole while the foamed resin 4b alone or a combination of the non-foamable resin 4a and the foamed resin 4b is filled in the remaining portion of the through hole, even when the entire insulator is heated at high temperatures and the non-foamable resin 4a thermally expands, the foamed resin 4b having excellent expansibility and shrinkability shrinks due to an increased internal pressure to absorb the thermal expansion. As a result, according to the present invention, the non-foamable resin 4a at the opposite end portions of the insulator body 1 will not project axially outwardly or exert tension upon the optical fiber core wire 3, so that cutting of the optical fiber core wire 3 or variation in the transmission loss due to the tension does not occur. In the embodiment of FIG. 4, since adhesion between the non-foamable resin 4a filled in the opposite end portions of the through hole 2 and the insulator body 1 is not lost, penetrating voltage resistance of the entire insulator will not be damaged and there is no likelihood that the optical fiber core wire 3 is degraded with salt, dusts, water, corrosive open air, etc. Further, since increase in the internal pressure of the through hole 2 is mitigated with a gas contained inside cells of the foamed resin 4b, the insulator body 1 will not be broken due to the increased internal pressure. Further, since the amount of the non-foamable resin 4a to be filled can be decreased by the amount of the foamed resin filled, the increase in the internal pressure can advantageously be suppressed.

As is evident from the aforegoing explanation, according to the present invention, by filling the foamed resin into the through hole excluding the opposite end portions thereof, thermal expansion of the non-foamable resin is absorbed, cutting of the optical fiber core wire, variation in the transmission loss, reduction in the penetrating voltage resistance of the insulator, and degradation of the optical fiber core wire can assuredly be prevented, and the insulator will not be broken. Thus, the insulators of this type have an extremely great practical value as optical fiber-containing insulators completely diminishing the problems possessed by the prior art.

Figure 5:
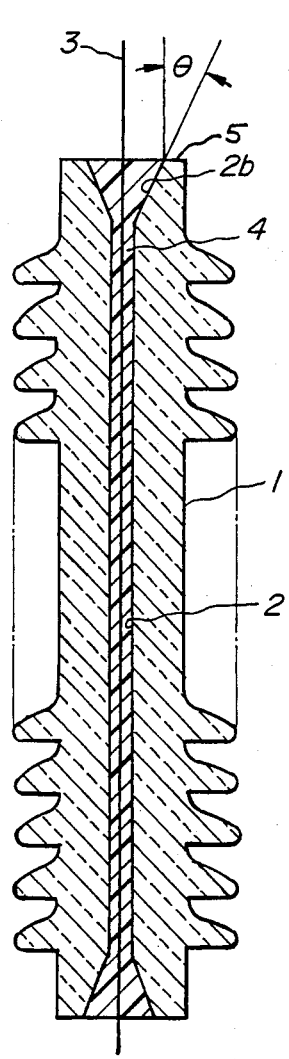
FIG. 5 is a central cross sectional view of a further embodiment according to the first aspect of the present invention.
Figure 6:
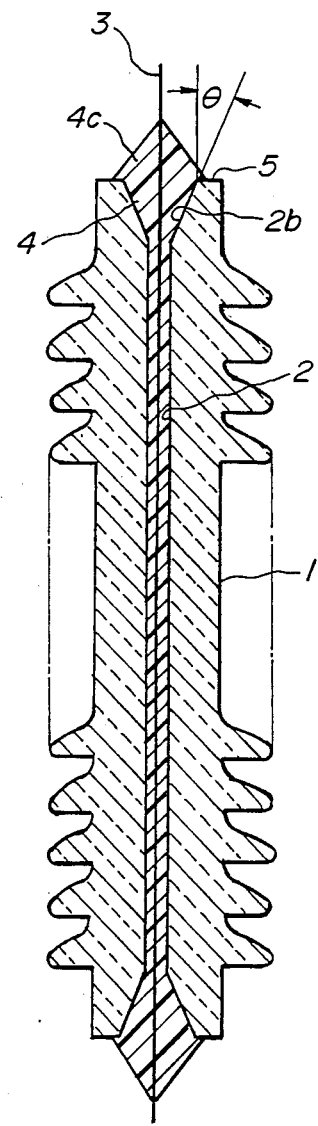
FIG. 6 is a central cross sectional view of a still further embodiment according to the first aspect of the present invention.
Figure 7:
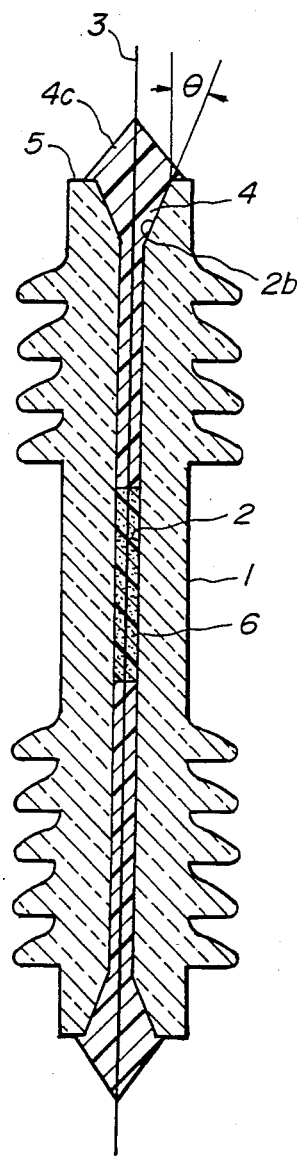
FIG. 7 is a central cross sectional view of a still further embodiment according to the first aspect of the present invention.

Next, FIGS. 5 through 7 show still other embodiments according to the first aspect of the present invention. In these embodiments, taper portions are formed at axially opposite ends of the through hole at an angle of 5° to 30° relative to the axis of the insulator body, and the optical fiber core wire passed through the through hole is sealingly fixed therein with an insulating material.

In FIG. 5, a through hole, which is centrally formed in a porcelain insulator body, is shaped in the form of a straight cylinder at the middle portion, and taper portions 2b are formed at axially opposite ends of the through hole 2. As shown in FIG. 5, the taper portion 2b is formed at an angle $\theta$ of 5° to 30° relative to the axis of the through hole 2, and greatly radially outwardly enlarged toward the end face 5. A reference numeral 3 denotes an optical fiber passed through the through hole 2 and gas-tightly fixed to the inner peripheral wall of the through hole 2 with an insulating material 4 such as a silicone rubber.

FIG. 6 shows another embodiment which is the same as the FIG. 5 embodiment except that expansion-absorbing portions 4c are each formed by swelling the insulating material axially outside the end face 5 of the insulator body 1 in a conical fashion. The bottom of the expansion-absorbing portion 4c is preferably located radially outwardly from the edge of the end of the taper portion 2b.

FIG. 7 shows a further embodiment which is the same as of FIG. 6 except that an expansion buffer section 6 is formed by charging an inorganic material such as alumina powder, siliceous sand, or glass wool in the central portion of the through hole 2.

As is the same with the aforegoing embodiments according to the present invention, while the insulator body 1 supports a power transmission line or a high voltage line, the optical fiber-containing insulators thus constructed are used to transmit signals detected by a voltage sensor, an electric current sensor, a temperature sensor, or the like attached to an electrically charging portion after being converted into optical signals to a ground contact side through the optical fiber core wire 3 which is passed through the through hole 2. However, since the axially outwardly enlarged taper portions 2b are formed at the opposite ends of the through hole 2 at an angle of 5° to 30° relative to the axis thereof, even when the insulator body 1 is heated at high temperatures and the insulating material 4 inside the through hole 2 thermally expands, the thermal expansion is absorbed laterally by the taper portions 2b. Thus, the axial projecting amount of the insulating material from the insulator body is very small. For this reason, cutting of the optical fiber 3 due to the axially projection of the insulating material 4 from the end surfaces of the insulator body 1 can be prevented, and gas tightness between the insulating material 4 and the inner peripheral surface of the through hole 2 will not be lost. Therefore, insulation of the insulator is not degraded.

In order to determine the optimum shape of the taper portion 3, a through hole of 5 mm in inner diameter was bored in each of porcelain bodies having a round rod shape of 50 mm in diameter and 200 mm long, and the tapering angle of taper portions were varied in a range from 1° to 60°. After an organic insulating material was filled into the through holes, the thus obtained insulators were subjected to heating tests.

| Angle (°) | Temperature | | | |
| --- | --- | --- | --- | --- |
|  | 60° C. | 80° C. | 100° C. | 120° C. |
| 1 | O | X | X | X |
| 3 | O | O | X | X |
| 5 | O | O | O | X |
| 10 | O | O | O | O |
| 20 | O | O | O | O |
| 30 | O | O | O | X |
| 45 | O | O | X | X |
| 60 | O | X | X | X |

In the above Table, "O" and "X" mean "no trouble" and "the insulating material projected axially outwardly from the end of the insulator body", respectively.

Results are shown in the above Table. As is seen therefrom, when the tapering angle θ of the taper portion 2b is less than 5°, lateral absorption of the thermal expansion by the taper portion 2b cannot sufficiently be attained so that the object of the present invention cannot be accomplished. To the contrary, if the angle θ is more than 30°, the inner volume of the taper portion 2b decreases so that the expansion-absorbing effect is not sufficient either and the insulating material 4 is likely to be peeled from the inner surface of the taper portion 2b.

In the embodiment of FIG. 6, the expansion-absorbing portion 4c is radially outwardly swelled to absorb the thermal expansion of the insulating material 4 inside the through hole 2. Thus, more excellent wire-cutting preventing effect can be obtained in this embodiment as compared with that in FIG. 5.

Furthermore, in the embodiment of FIG. 7, since the expansion buffer section 6 is formed by charging an inorganic material in the central portion of the through hole 2, the thermal expansion of the insulating material 4 can be mitigated axially inwardly by this section. Thus, more excellent wire-cutting preventing effect can be obtained.

As is evident from the aforegoing explanation, since the insulating material is prevented from projecting axially outwardly from the end surfaces of the insulator body due to thermal expansion, the cutting of the optical fiber due to the thermal expansion can assuredly be prevented and gas tightness between the inner surface of the through hole and the insulating material is maintained. Thus, degradation of the penetrating voltage resistance of the entire insulator can be avoided. Thus, the invention has an extremely great practical value as optical fiber-containing insulators sweeping away the problems possessed by the prior art.

Next, a further embodiment according to the first aspect of the present invention will be explained with reference to FIGS. 8 and 9.

Figure 8:
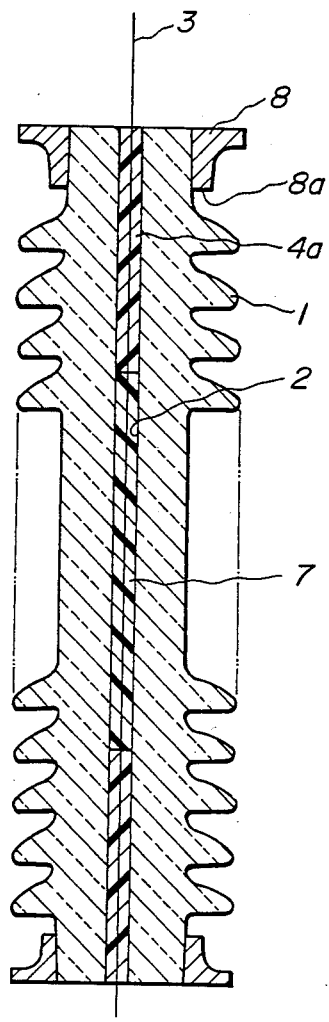
FIG. 8 is a central cross sectional view of a still further embodiment according to the first aspect of the present invention.
Figure 9:
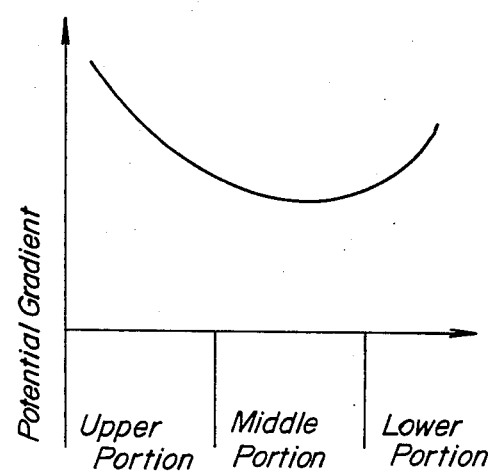
FIG. 9 is a diagram showing the relationship between the location of the insulator and the potential gradient.

In FIG. 8, a flange type fitting metal member 8 is attached to each of opposite ends of an insulator body 1 having a through hole 2 bored axially in the central portion thereof. A sealing portion 4a is formed by filling an insulating material in each of the opposite end portions of the through hole in a predetermined length to gas tightly seal an optical fiber 3 inside the through hole 2. A buffer portion 7 is formed in the central portion of the through hole 2 between the sealing portions 4a, 4a. The buffer portion 7 is not adhered to the insulator body 2.

As an insulating material constituting the sealing portion 4a; silicone rubber is used in this embodiment. But, a inorganic material such as a sealing glass may be used. The sealing portion 4a is extended such that it extends axially inwardly beyond an edge 8a of the fitting metal member 8. This is because as is clear from a potential gradient diagram of FIG. 9, an electric field is likely to concentrate upon the edge 8a of the fitting metal member 8. Thus, it is not preferable to form a hollow space near the edge of the fitting metal member 8 because such leads to degradation of the insulating performance of the insulator.

On the other hand, the buffer portion 7 is not adhered to the inner surface of the insulator body. Thus, a hollow space may be present inside the buffer portion 7. However, it is preferable to charge a powdery, granular, or fibrous elastic insulating material, for instance, an inorganic powder, inorganic fibers, or granular substance such as alumina powder, siliceous sand, or glass wool, into the buffer portion. In this embodiment, alumina powder is charged into the buffer portion.

As is the same with the previous embodiments, while the insulator body 1 supports a power transmission line or a high voltage line, the thus constituted optical fiber-containing insulator is used to transmit signals detected by a voltage sensor, an electric current sensor, a temperature sensor, or the like attached to an electrically charging section after being converted into optical signals to a ground contact side through the optical fiber 3 passed through the interior of the through hole 2. However, in the present embodiment, since only the opposite end portions of the through hole 2 are gas tightly sealed while the buffer portion 7 not sealingly adhered is formed at the central portion of the through hole 2, even when insulator body 1 is heated at high temperatures and the insulating material thermally expands inside the through hole 2, the sealing material is prevented from projecting from the end surface of the insulator body because the length and the total expansion amount of the sealing portion 4a are short and small, respectively, and the insulating material expands toward the buffer portion 7. Particularly, as in the illustrated embodiment in which an elastic insulating material is charged inside the buffer portion 7, the radially inward expansion of the insulating material is mitigated and more excellent wire cutting-preventing effect can be obtained.

For this reason, cutting of the optical fiber 3 due to the axially outward projection of the insulating material 4 from the end surfaces of the insulator body 1 can be prevented, and adhesion between the sealing portion 4a and the inner peripheral surface of the through hole 2 is not lost. Therefore, penetrating voltage resistance of the entire insulator will not be degraded. Further, the optical fiber 3 is prevented from being degraded with salt, dusts, water, corrosive open air, etc.

As is evident from the aforegoing explanation, the insulating material is prevented from projecting from the end surfaces of the insulator body due to thermal expansion, so that the cutting of the optical fiber and reduction in the insulating characteristic can assuredly be prevented. Thus, degradation of the penetrating voltage resistance can be avoided. Thus, the invention has an extremely great practical value as optical fiber-containing insulators sweeping away the problems possessed by the prior art.

Then, an embodiment according to the second aspect of the present invention will be explained with reference to FIGS. 10 and 11. This embodiment is characterized in that a spacer is provided inside a through hole between the inner peripheral wall of the through hole and an optical fiber and that the optical fiber is passed through a central hole of the spacer.

Figure 10:
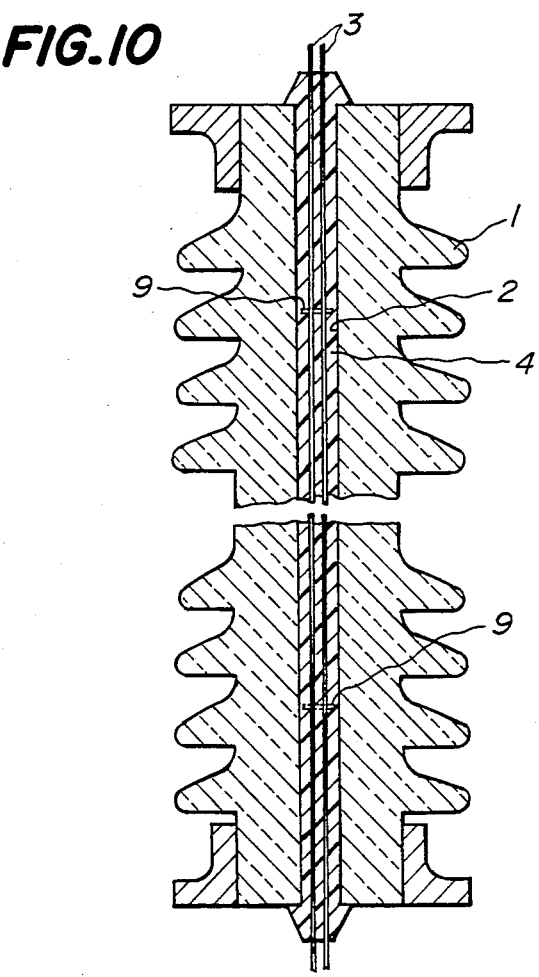
FIG. 10 is a central cross sectional view of an embodiment according to the second aspect of the present invention.
Figure 11:
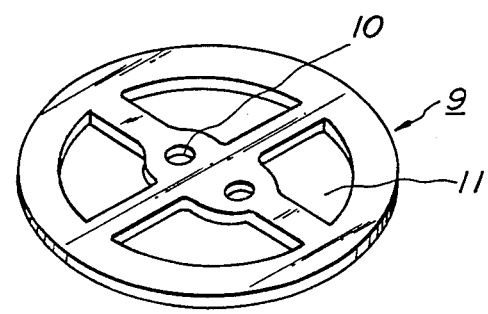
FIG. 11 is a perspective view of a spacer.

Specifically referring to FIGS. 10 and 11, an appropriate number of spacers 9 are inserted inside the through hole 2 so that optical fibers 3 are held in the central portion of a through hole 2 by these spacers 9. That is, the optical fibers 3 are held in the central portion of the through hole 2 in the state that the optical fibers are passed through respective central holes 10 formed in the spacer 9. This is seen in FIG. 11 in an enlarged scale. The spacer 9 is provided with the central holes 10 through which the optical fibers 3 are passed and with penetrating holes 11 provided around the central holes 10 to allow the sealing material to enter therein. In this embodiment, two central holes are formed, through which two optical fibers 9 are passed.

However, as a matter of course, if one optical fiber 3 is to be held by the insulator body, a single central hole 10 has only to be formed in a spacer 9. The spacer 9 is fixed with the sealing material 4 as shown in FIG. 10. In order to effect complete joining between the spacer and the sealing material, the spacer 9 is made of substantially the same material as that of the sealing material 4. The configuration of the spacer 9 is not necessarily limited to a planar shape shown. The spacer 9 may be designed in any shape so long as the spacer can hold the optical fiber 3 in the central portion of the through hole 2. It is preferable to set a spacing between the spacers 9, 9 in a range from about 50 to about 300 mm. This is because if it is less than 50 mm, the number of steps for producing the insulator increases, while if it exceeds 300 mm, the optical fiber 3 may slacken so that the optical fiber is difficult to assuredly be supported in the center of the through hole of the insulator body.

The above-constituted insulator is produced by preliminarily passing the optical fibers 3 through the central holes 10 of the spacers 9, inserting the spacers 9 and the optical fibers 3 into the through hole 2 of the insulator body 1, pouring a liquid sealing material 4 inside the through hole 2 from an end face of the insulator body 1, and curing the sealing material 4 inside the through hole 2. Since the optical fibers 3 are accurately held in the central portion of the through hole 2 by the spacers 9 before the sealing material 4 is poured thereinto, the sealing material 4 is uniformly filled all around the optical fibers 3. Therefore, the optical fibers 3 are completely fixed inside the through hole 2 of the insulator body 1 with the sealing material 4 without leaving any dead space. Thus, when the optical fiber-containing insulator according to the present invention is used to transmit optical signals taken out from a high voltage power transmission electric line to a ground contact side, insulation characteristic of the insulator will not be degraded due to invasion of water, moisture, etc. and troubles such as insulation breakage will not occur.

As is evident from the aforegoing explanation, according to this embodiment, the optical fiber or fibers can accurately be held in the central portion of the through hole of the insulator body by a simple construction so that degradation of the insulation due to eccentrical deviation of the optical fiber or fibers can assuredly be prevented. Thus, the optical fiber-containing insulator of this type has an extremely great practical value as optical fiber-containing insulators sweeping away the problems possessed by the prior art.

In the following, still further embodiments according to the second aspect of the present invention will be explained with reference to FIGS. 12 and 13. These embodiments are characterized in that a taper portion axially outwardly enlarged is formed at each of opposite ends of the through hole formed in an insulator body and a frusto-conical porcelain spacer, which has an optical fiber passed through a through hole bored at a central portion thereof, is adhered to the above taper portion with an inorganic binder so that the optical fiber is held in the central portion of the through hole.

Figure 12:
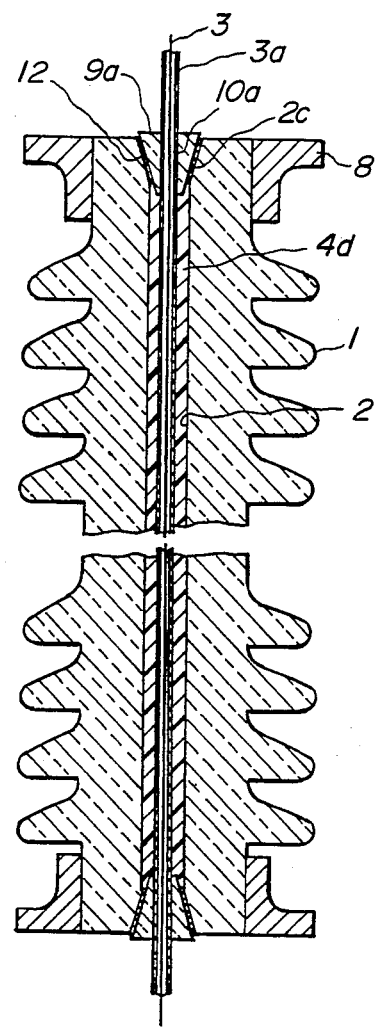
FIG. 12 is a central cross sectional view of another embodiment according to the second aspect of the present invention.

Now turning to FIG. 12, a taper portion 2c axially outwardly spreads at each of the opposite ends of a through hole 2 which is formed along a central axis of the insulator body 1. A reference numeral 9a denotes a porcelain spacer having a frusto-conical outer shape. The spacer 9a is sealingly bonded to the taper portion 2c with an inorganic material such as a lead boronate based glass having a low melting point. The spacer 9a has, at its central portion, a through hole 10a through which the optical fiber 3 is passed. The optical fiber is held accurately in the central portion of the through hole 2 by the porcelain spacers 9a, 9a at the opposite ends thereof. The reason why the outer shape of the porcelain spacer is designed frusto-conical is that alignment is rendered assured with ease and that the thickness of the inorganic adhesive layer 12 is made as small as possible to prevent deterioration when the insulator is used for an extended time period. In the embodiment of FIG. 12, the optical fiber 3 is protected by a protective tube 3a made of glass or quartz, and is held together with the protective tube 3a by means of the porcelain spacer 9a. Thus, the optical fiber 3 can be prevented from being bent at the ends of the insulator body. The protective tube 3a and the optical fiber 3 are sealingly bonded together with an inorganic material such as lead boronate based glass having low melting point. A filler 4d is charged between the optical fiber 3 held in the center of the through hole 2 in this manner and the inner wall of the through hole 2 of the insulator body 1, and consists of an insulating, buffering material such as a ceramic powder or inorganic fibers and a water-absorbing material such as silica gel. The filler 4d serves to protect the optical fiber from mechanical vibrations and if the sealingness were broken and water entered the through hole 2, functions to prevent deterioration of insulating property.

Figure 13:
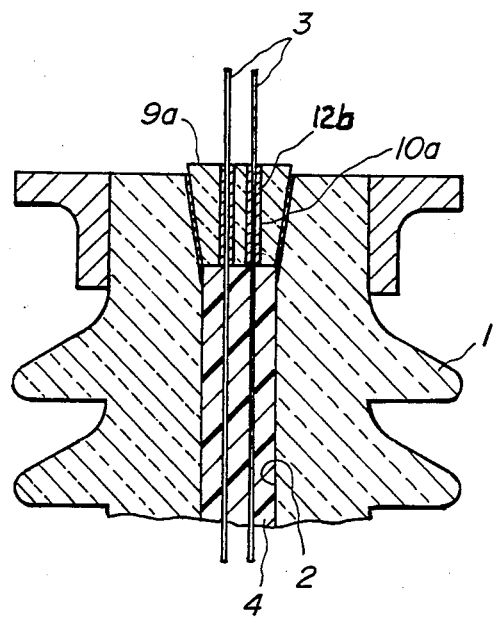
FIG. 13 is a central cross sectional view of a principal portion of still another embodiment according to the second aspect of the present invention.

According to the embodiment shown in FIG. 13, no protective tube 3a is attached to an optical fiber 3, and the optical fiber 3 is directly sealingly joined to a porcelain spacer 9a with an inorganic adhesive layer 12b. Needless to say, when plural optical fibers are employed, the number of penetrating holes are correspondingly formed in the porcelain spacer 9a.

The optical fiber-containing insulator having the above construction is produced by preliminarily passing the optical fiber 3 through the central hole 10a of the porcelain spacer 9a, and sealingly bonding the spacers 9a with the optical fiber to the taper portions 2c of the insulator body 1 with an inorganic sealant. Since the optical fiber 3 is accurately held in the central portion of the through hole 2 of the insulator body 1 by the porcelain spacers 9a, 9a, there is no possibility that troubles such as reduction in insulation due to eccentric deviation of the optical fiber 3 occurs. Further, since the porcelain spacer 9a is snugly fitted to the taper portion at each of the ends of the through hole 2 and sealingly bonded thereto with the inorganic sealant, more excellent long use durability can be obtained as compared with conventional insulators using seal bonding with a silicone resin or the like. In addition, since the filler 4 is filled between the optical fiber and the inner peripheral wall of the through hole 2, the optical fiber can be protected from mechanical vibrations, etc. Even if the seal bonding is broken, insulation can be prevented from being damaged.

As is evident from the aforegoing explanation, according to this embodiment, troubles due to eccentric deviation of the optical fiber inside the through hole can be prevented, and sufficient durability can be maintained for an extended time period as compared with ordinary type insulators. Thus, the optical fiber-containing insulator according to the present invention is advantageously used to transmit signals from a high voltage power transmission line to a ground contact side. Therefore, the present invention has an extremely great practical value as optical fiber-containing insulators sweeping away the problems possessed by the prior art.

Lastly, still further embodiments according to the second aspect of the present invention will be explained with reference to FIGS. 14 through 17.

First, one of these embodiments is characterized in that a hollow toroidal spacer made of substantially the same elastic material as that of the insulating material is inserted into a through hole formed in an insulator body and an optical fiber is passed through the central hole of the spacer and sealingly bonded therein with a sealant.

Further, the remaining embodiment has been contrived to solve problems peculiar to a case where a plurality of insulators are connected in series to pass an optical fiber therethrough. That is, when a plurality of optical fiber-containing insulators are connected together in series, a problem as to how to deal with end surfaces of the insulators to be connected together occurs in addition to those encountered in a single optical fiber-containing insulator. In order to solve such a problem, as described in Japanese patent application laid-open No. 60-262,104, NGK Insulators, Ltd, had contrived a process for protecting an optical fiber by attaching a bendable connecting metal member to a joining section between two insulators. However, this poses a new problem that the entire length of the insulator assembly becomes longer by that of the connecting metal member. To solve this problem, attempt has been made to directly join two insulators while their end surfaces are intimately adhered to each other. However, a sealant inside through holes oozes outside at the joined end surfaces of the insulators and there is the possibility that the insulators may be broken due to thermal expansion of the sealant at elevated temperatures. The remaining embodiment is therefore characterized in that a hollow toroidal spacer made of substantially the same elastic material as the sealant is arranged at the joining end surfaces around the through holes of the insulator bodies and an optical fiber is passed through the central hole of the spacer and sealingly bonded thereto with the sealant.

Figure 14:
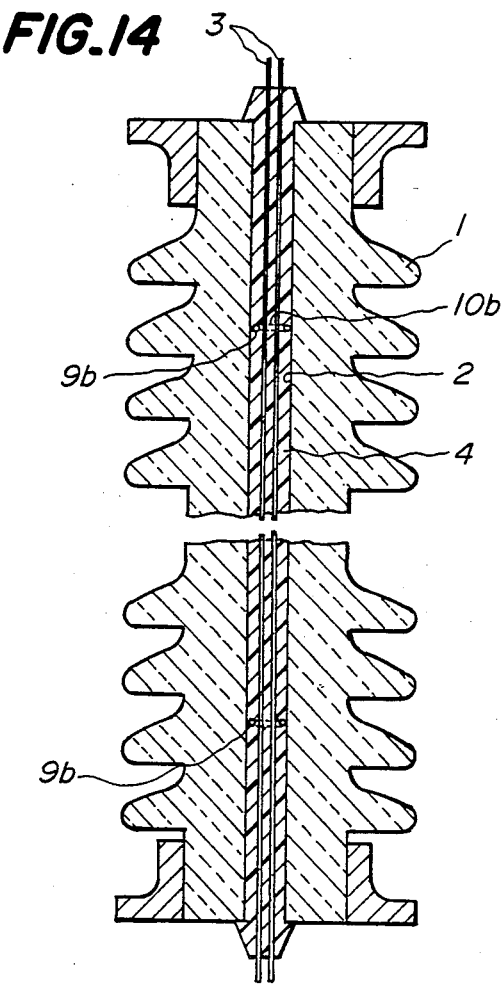
FIG. 14 is a central cross sectional view of a further embodiment according to the second aspect of the present invention.
Figure 15:
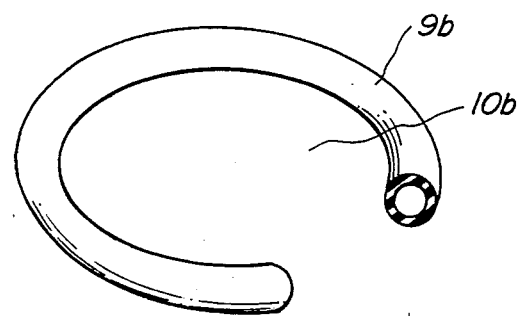
FIG. 15 is a partially cutaway perspective view of a spacer.

Now, turning to FIG. 14, an appropriate number of spacers 9b are inserted into a through hole 2 formed in the central portion of an insulator body 1. As shown in FIG. 15 in an enlarged scale, the spacer 9b is designed in a hollow toroidal shape, and its outer diameter is set slightly larger than the inner diameter of the through hole 2. The hollow inner space of the spacer 9b may be filled with dry air. However, $SF_6$ gas having high insulation is preferably sealingly charged therein, because no corona discharge occurs. The spacer 9b is made of substantially the same material as a sealant 4, for instance, a silicone rubber. An optical fiber 3 is sealingly fixed inside the through hole 2 with the sealant poured all over the through hole in the state that the optical fiber 3 is passed through central holes 10b of the spacers 9b.

As mentioned above, when the hollow toroidal spacers 9b are used, the optical fiber 3 can easily and assuredly be prevented from contacting the inner peripheral surface of the through hole 2. Further, since the sealant 4 is filled into the entire inside of the through hole via the central holes 10b of the spacers 9b and is integrally solidified together with the spacers 9b made of substantially the same material, insulating characteristic inside the through hole 2 can be improved. Furthermore, since the spacer closely adheres to the inner peripheral surface of the through hole 2 due to its elasticity, the spacer will not deviate and can be located easily during assembling. The spacer functions as a packing to prevent water from entering inwardly beyond it, even if the sealant 4 were peeled from the insulator body. In addition, when the sealant thermally expands during use, the hollow toroidal spacers 9b absorb the thermal expansion due to their inherent elasticity. Thus, the insulator body 1 can be prevented from breaking due to the thermal stress.

Figure 16:
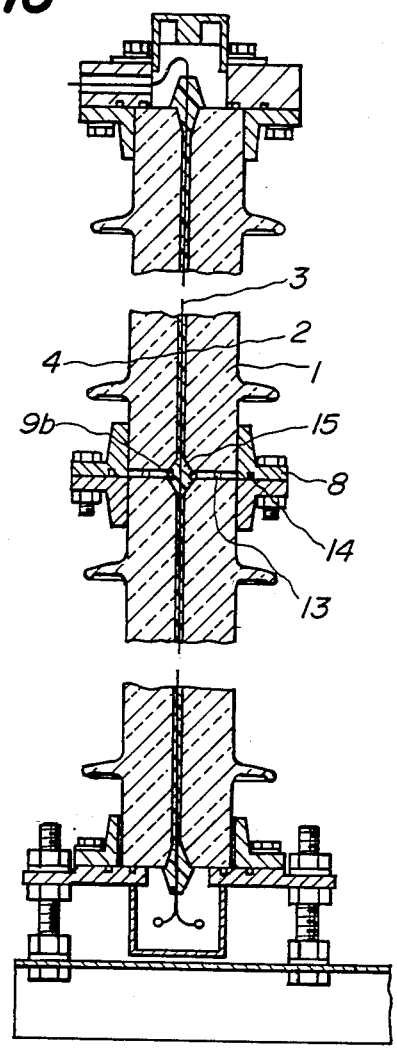
FIG. 16 is a central cross sectional view of a still further embodiment according to the second aspect of the present invention.
Figure 17:
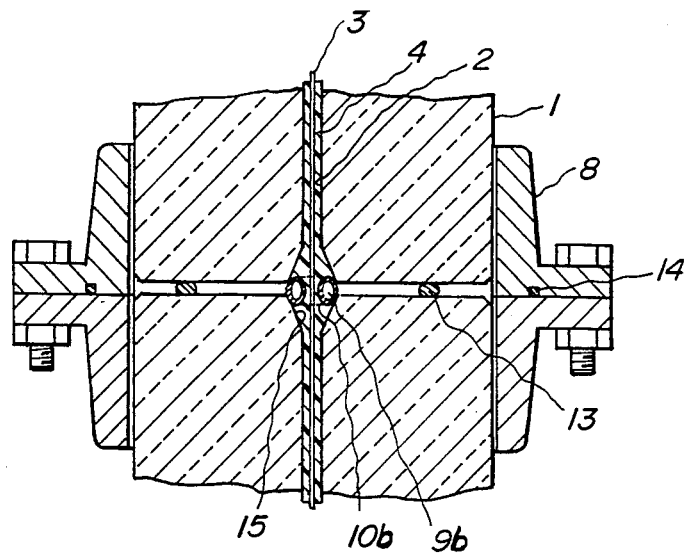
FIG. 17 is a central cross sectional view of a still further embodiment according to the second aspect of the present invention.

FIGS. 16 and 17 show a further embodiment in which a plurality of insulator bodies 1, 1 are connected in series in the state that their end surfaces are joined together by means of metal flange members 8, 8. A hollow toroidal spacer 9b similar to that shown in FIG. 15 is arranged at the joining end surfaces around the through holes. FIG. 17 shows an enlarged view of the joining portion of FIG. 16. As seen in FIG. 17, a taper-like enlarged portion 15 is formed at each of the opposite ends of the through holes 2, and the spacer 9b is located to intimately contact with the inner surfaces of the enlarged portions 15. An optical fiber 3 is passed through a central hole 10b of the spacer 9b. As a material constituting the spacer 9b, substantially the same material as that of the sealant 4, for instance, silicone rubber may be used, as in the case with the embodiment in FIGS. 15 and 16. Reference numerals 13 and 14 are O-rings arranged between the joining end surfaces of the insulator bodies 1 and between the flanges 8, respectively.

When the hollow toroidal spacer 9b is arranged between the joining end surfaces of the insulator bodies 1, 1 as mentioned above, the optical fiber 3 is accurately located and protected by the spacer 9b. Therefore, conventionally used connecting metal fitting members are unnecessary so that the entire length of the insulator assembly can be shortened, and reduction in weight and increase in bending strength can be attained. Furthermore, since the optical fiber 3 can be passed through the central hole 10b of the spacer and sealingly and integrally with the sealant 4 poured after a plurality of the insulator bodies 1, 1 are joined together through the spacer 9b, sealingly bonding operation can be facilitated. Moreover, since the spacer 9b is abundant with elasticity, it functions as a packing to prevent the sealant 4 from oozing out between the end surfaces of the insulator bodies. Thus, the insulator bodies 1 can be prevented from being broken by thermal expansion of the oozing sealant 4 and thermal stress during the thermal expansion can be absorbed by the elasticity of the spacer. As in the illustrated embodiment, when the O-rings 13 and 14 are interposed between the joining surfaces, it is possible to assuredly prevent water from entering the joining end surfaces from outside.

As is evident from the aforegoing explanation, according to the present invention, by employing the hollow toroidal spacers made of substantially the same elastic material as that of the sealant, the optical fiber can accurately be held in the central portion of the through hole or the through holes in the case of a single insulator body or plural insulator bodies connected together in series, respectively. Consequently, degradation in insulation can be prevented, the optical fiber can easily be sealingly bonded, and the insulator can be prevented from breaking due to thermal expansion. Further, even when a plurality of the insulators are connected together in series, the entire length of the insulator assembly can be shortened by omitting metal connecting members and the bending strength of the entire insulator assembly can be elevated. Thus, the invention has an extremely great practical value as optical fiber-containing insulators sweeping away the problems possessed by the prior art.

What is claimed is:

1. An optical fiber-containing insulator comprising an insulator body having a through hole axially provided in a central portion thereof, an optical fiber core wire passing through the through hole, an insulating material filled between an inner peripheral surface of the through hole and the optical fiber core wire, and means for preventing the filled insulating material from axially protruding out of the insulator body even at high temperatures.

2. An optical fiber-containing insulator according to claim 1, wherein the protrusion-preventing means is constituted by taper portions, said taper portions each being provided at the inner peripheral surface of the through hole and enlarged axially outwardly from the middle portion to respective opposite ends of the through hole.

3. An optical fiber-containing insulator according to claim 2, wherein a tapering degree of each of the taper portions is in a range from 0.01 to 0.05.

4. An optical fiber-containing insulator according to claim 1, wherein the protrusion-preventing means is constituted by the insulating material itself, said insulating material consisting of a non-foamable resin filled at the opposite ends of the through hole and a foamed resin or a combination of a non-foamable resin and a foamed resin filled in the through hole excluding the opposite ends thereof.

5. An optical fiber-containing insulator according to claim 4, wherein the foamed resin is a material selected from the group consisting of a foamed styrol resin, a foamed polyethylene resin, and a foamed silicone resin.

6. An optical fiber containing insulator according to claim 4, wherein the non-foamable resin is a material selected from the group consisting of a silicone resin and an epoxy resin.

7. An optical fiber-containing insulator according to claim 1, wherein the protrusion-preventing means is constituted by taper portions formed at opposite ends of the through hole, said taper portions being enlarged axially outwardly at a tapering angle of 5° to 30°.

8. An optical fiber-containing insulator according to claim 7, wherein an expansion-absorbing portion is formed by swelling the insulating material axially outwardly from each of the end surfaces of the through hole of the insulator body.

9. An optical fiber-containing insulator according to claim 7, wherein a thermal expansion buffer portion is formed by filling an inorganic substance into the central portion of the through hole.

10. An optical fiber-containing insulator according to claim 1, wherein the protrusion-preventing means is constituted by the insulating material itself, said insulating material consisting of gas-tight insulating sealed portions at the opposite ends of the through hole and a buffer portion provided at the central portion of the through hole for absorbing thermal expansion.

11. An optical fiber-containing insulator according to claim 10, wherein the buffer portion is a hollow space.

12. An optical fiber-containing insulator according to claim 10, wherein an elastic insulating material is filled in the buffer portion.

13. An optical fiber-containing insulator comprising an insulator body having a through hole axially provided in a central portion thereof, an optical fiber core wire passing through the through hole, an insulating material filled between an inner peripheral surface of the through hole and the optical fiber core wire, and means for holding the optical fiber core wire at the central portion of the through hole of the insulator body.

14. An optical fiber-containing insulator according to claim 13, wherein the holding means is constituted by a spacer, said spacer being made of substantially the same material as that of the insulating material, and said spacer having a central through hole through which the optical fiber core wire is passed so that the optical fiber core wire is held in the central portion of the insulator body.

15. An optical fiber-containing insulator according to claim 13, wherein the spacer has penetrating holes around the through hole through which the optical fiber core wire is passed, said penetrating holes being filled with the insulating material.

16. An optical fiber-containing insulator according to claim 13, wherein said holding means is constituted by taper portions enlarged axially outwardly at opposite ends of the through hole of the insulator body and porcelain spacers which each have a tapered outer peripheral surface enlarged axially outwardly and a central through hole and which are bonded to said respective taper portions with an inorganic material, the optical fiber core wire being passed through the central holes of the spacers so that the optical fiber core wire is held in the central portion of the through hole of the insulator body.

17. An optical fiber-containing insulator according to claim 16, wherein the optical fiber core wire is provided by protective tubes attached at the respective central holes of the spacers and arranged around the optical fiber core wire.

18. An optical fiber-containing insulator according to claim 16, wherein the optical fiber core wire and the porcelain spacers are sealingly bonded with an inorganic material.

19. An optical fiber-containing insulator according to claim 13, wherein the holding means is a hollow toroidal spacer made of substantially the same material as that of the insulating material, said hollow toroidal spacer being inserted between the inner peripheral surface of the through hole of the insulator body and the optical fiber core wire, and said hollow toroidal spacer having a central hole through which the optical fiber core wire is passed so that the optical fiber core wire is held in the central portion of the through hole of the insulator body, said optical fiber core wire being and sealingly bonded to the insulator body with an inorganic material.

20. An optical fiber-containing insulator assembly comprising a plurality of insulator bodies each having a through hole axially provided in a central portion thereof, an optical fiber core wire being passed through the through holes of the insulator bodies, an insulating material being filled between inner peripheral walls of the through holes of the insulator bodies and the optical fiber core wire, and a spacer being made of substantially the same material as that of the insulating material, said spacer having a central hole, wherein end surfaces of the adjacent insulator bodies are joined together via the spacer, and the optical fiber core wire is passed through the central hole of the spacer and is sealingly bonded to the insulator bodies with the insulating material, so that the optical fiber core wire is held in the central portions of the through holes of the insulator bodies.

* * * * *